United States Patent
Kennicutt et al.

[11] 3,847,492
[45] Nov. 12, 1974

[54] TRACTOR CAB MOUNTING APPARATUS

[75] Inventors: Robert B. Kennicutt, Morton; William T. Mounts, Chillicothe, both of Ill.

[73] Assignee: Caterpillar Tractor Co., Peoria, Ill.

[22] Filed: Aug. 8, 1972

[21] Appl. No.: 278,731

[52] U.S. Cl. ............................... 403/224, 403/157
[51] Int. Cl. ............................................. F16b 9/00
[58] Field of Search ...... 287/85; 403/220, 221, 222, 403/223, 157, 150, 145, 224; 248/9, 10, 8, 18, 22, 14

[56] References Cited
UNITED STATES PATENTS

| | | | |
|---|---|---|---|
| 1,611,906 | 12/1926 | Gurney | 248/9 X |
| 2,126,703 | 8/1938 | Schmidt | 287/85 R |
| 2,386,463 | 10/1945 | Hile | 248/10 X |
| 2,555,347 | 6/1951 | Lee | 287/85 R X |
| 2,730,356 | 1/1956 | Hunter | 248/22 X |
| 2,814,538 | 11/1957 | Connolly | 287/85 R UX |
| 2,868,571 | 1/1959 | Owen | 287/85 R |
| 3,042,394 | 7/1962 | Bliss | 287/85 R X |
| 3,215,384 | 11/1965 | Chambers | 287/85 R X |
| 3,350,042 | 10/1967 | Stewart et al. | 248/9 X |
| 3,467,421 | 9/1969 | Bentley | 287/85 R |

*Primary Examiner*—Dennis L. Taylor
*Attorney, Agent, or Firm*—Phillips, Moore, Weissenberger, Lempio & Strabala

[57] ABSTRACT

A tractor has a protective cab mounted thereon by means of a plurality of mounting structures. Each mounting structure includes a member extending from the cab and an associated member extending from the tractor, allowing a degree of movement of one member in all directions to an extent relative to the other. Movement of one member relative to the other in any direction results in compression of a resilient member associated with the extended members. Movement of one extended member relative to the other in at least one particular direction is resisted by the resilient member at a given spring rate for a certain extent of travel, and additional travel in that direction is resisted by another, greater, spring rate.

7 Claims, 4 Drawing Figures

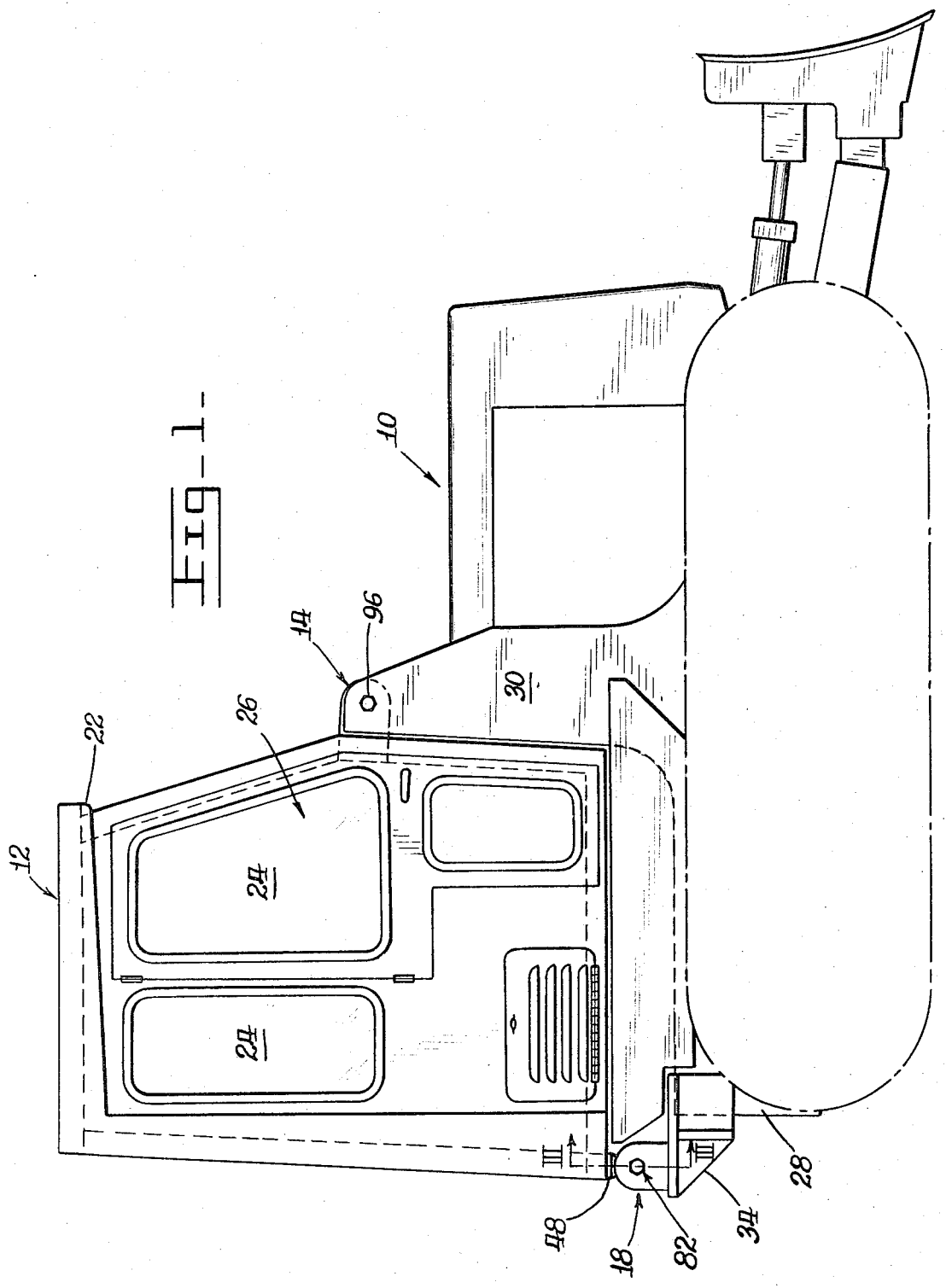

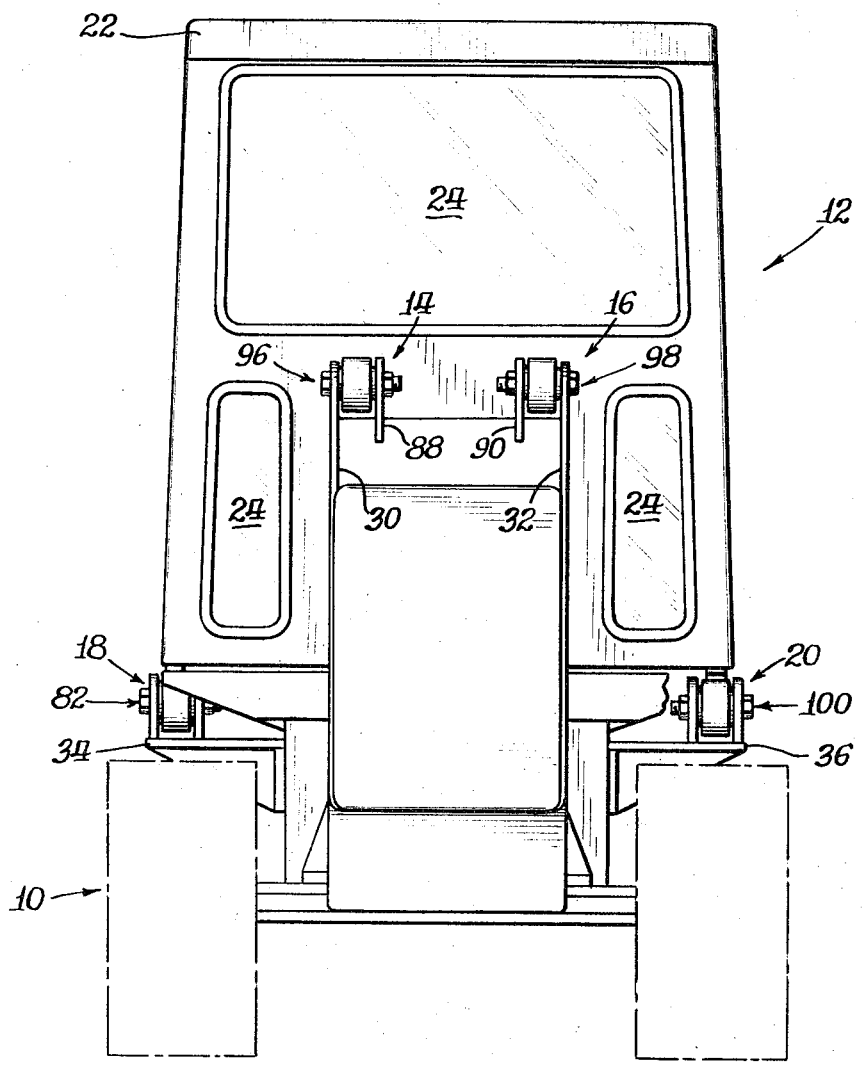

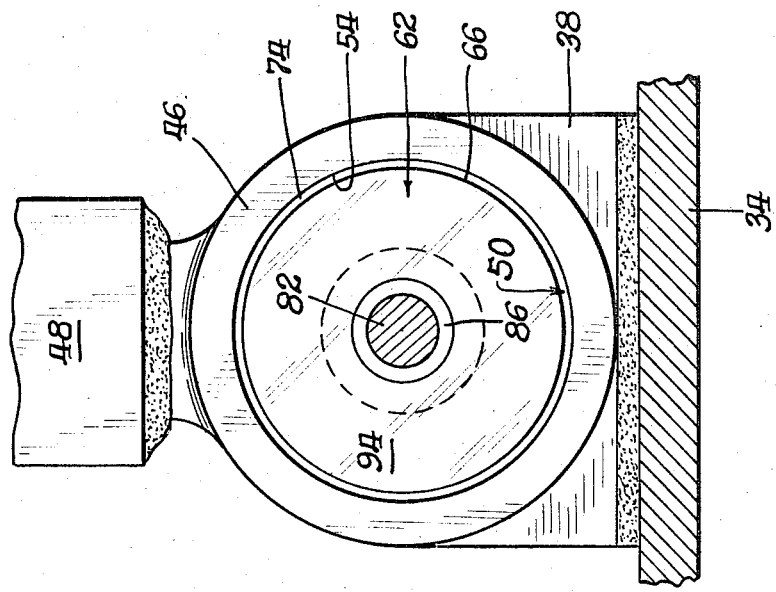
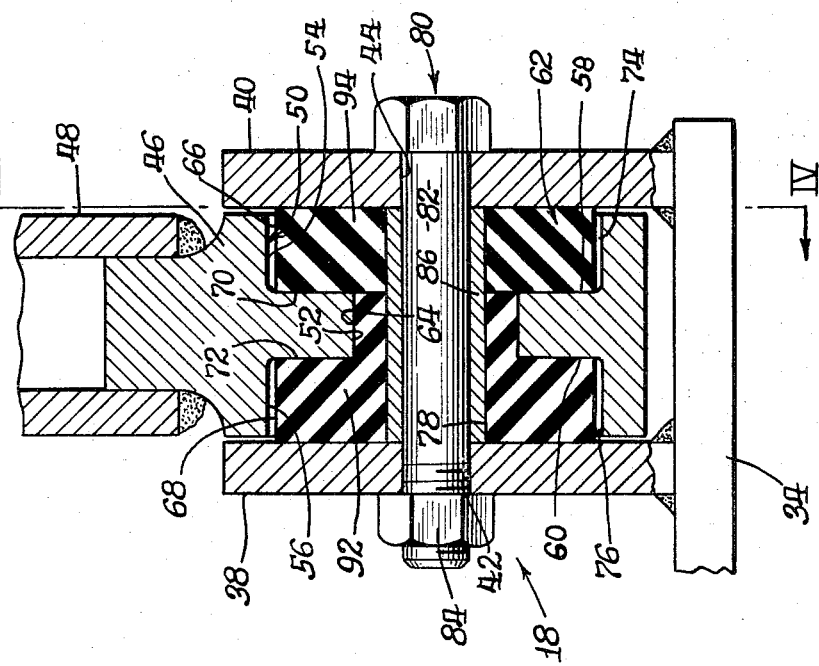

TRACTOR CAB MOUNTING APPARATUS

BACKGROUND OF THE INVENTION

This invention relates to means for mounting a protective cab on a tractor, and more particularly, to such means which provide resilient resistance in all directions of movement of the cab relative to the tractor and in addition, provide a varying spring rate of resilient resistance under certain conditions.

Earth-moving and construction vehicles frequently have roll-over protective structures mounted thereon to protect the operator against injury from the overturning of the vehicle. Such protective structure should, of course, provide proper protection for the operator in the event of such overturning. Consequently, the means for mounting the protective structure to the vehicle must be designed with this problem particularly in mind.

A secondary, but still very important problem encountered in mounting such a rollover protective structure to a vehicle is that of isolating the protective structure from shock loads and vibrations set up by normal vehicle operations. This problem is aggravated on a tractor type vehicle since such a vehicle is generally operated on relatively rough terrain, and the protective structure mounted thereon is consequently subjected to shock loads in all directions. Mounting means for mounting the protective structure to the vehicle should ideally be designed with this problem in mind also. Further, such mounting means should be relatively simple in design and allow for the easy removal of the protective structure from the vehicle so that the components therebeneath may be easily reached and serviced.

Although various mounting means can be found in prior patents (see, for example, U.S. Pat. No. 3,203,728 to Wood, U.S. Pat. No. 3,036,858 to Fingerut, and U.S. Pat. No. 3,527,474 to Boersma), it has been found that such mountings have not been totally effective under the conditions as set out above. Initially, it should be pointed out that each of such mountings includes resilient means, i.e., a rubber member, which supports the protective structure with a single, relatively high, spring rate which has been found to be not particularly effective in stopping protective structure panel vibration. Furthermore, it will be seen that none of these patents provides means for resiliently resisting movement of the protective structure in all directions relative to the vehicle body, i.e., shock loads in certain directions will not necessarily compress the rubber member provided.

SUMMARY OF THE INVENTION

It is therefore an object of this invention to provide means for mounting a protective structure to a vehicle, wherein the mounting means allow a degree of relative movement between the protective structure and the vehicle in all directions, with such movement being resiliently resisted in all such directions.

It is a further object of this invention to provide means for mounting a protective structure to a vehicle which, while fulfilling the above object, properly isolates the protective structure from shock loads and vibrations set up by normal vehicle operation.

It is a still further object of this invention to provide means for mounting a protective structure to a vehicle which, while fulfilling the above objects, is simple in design, and allows for the easy and convenient removal of the protective structure from the vehicle.

Broadly stated, in combination with a tractor and a tractor cab, the invention comprises a plurality of mounting means for mounting the cab to the tractor at a plurality of points. Each mounting means comprises means associated with the tractor and the cab for securing a portion of the cab relative to a portion of the tractor, meanwhile allowing a degree of travel of the portion of the cab in all directions relative to the portion of the tractor, and resilient means for resiliently resisting travel of the portion of the cab in all directions relative to the portion of the tractor comprising resilient material provided so that a portion of such resilient material is compressed when the portion of the cab is moved in any direction relative to the portion of the tractor. Further, the resilient means resiliently resist a portion of said travel in at least one direction at a given spring rate, and resiliently resist additional travel in that one direction at a spring rate greater than the first-mentioned rate.

BRIEF DESCRIPTION OF THE DRAWINGS

These and other objects of the invention will become apparent from a study of the following specification and drawings, in which:

FIG. 1 is a side elevation of the vehicle embodying the invention;

FIG. 2 is a front elevation of the vehicle of FIG. 1, partially broken away;

FIG. 3 is a sectional view taken along the line III—III of FIG. 1; and,

FIG. 4 is a sectional view taken along line IV—IV of FIG. 3.

DESCRIPTION OF THE PREFERRED EMBODIMENT

Shown generally in FIGS. 1 and 2 is the combination tractor vehicle 10 and protective rollover structure or cab 12. A plurality of mounting means 14, 16, 18, 20 are associated with the tractor 10 and cab 12 for mounting the cab 12 to the tractor 10, each mounting means securing a portion of the cab 12 relative to a portion of the tractor 10. The cab 12 includes a plurality of cab panels 22, 24 secured thereto, so that cab 12 encloses the operator station 26 of the tractor 10.

The tractor 10 includes a main frame 28 having a pair of frame towers 30, 32 extending upwardly therefrom. The tractor 10 further includes support brackets 34, 36 secured to the rear of the frame 28. The mounting means 14, 16, 18, 20 are associated with the frame towers 30, 32 and support brackets 34, 36, respectively, in a manner which will now be described in detail.

Extending outwardly and upwardly from support bracket 34 is a pair of spaced, generally parallel plates 38, 40 which define axially aligned apertures 42, 44 (FIGS. 3 and 4). An annular lug member 46 extends from post 48, which is in turn fixed to cab 12. The lug member 46 extends outwardly from the cab 12 and defines an aperture 50, which is axially aligned with the plate apertures 42, 44, and which has first, second and third cylindrical portions 52, 54, 56. The cylindrical portion 52 has a certain first radius, and cylindrical portions 54, 56 have radii greater than the first radius. The radii of cylindrical portions 54, 56 are equal to each other. Cylindrical portions 54, 56 are spaced apart by cylindrical portion 52. Cylindrical portions 52, 54 are interconnected by a radial portion 58, and cylindrical portions 52, 56 are interconnected by a radial portion 60.

Annular resilient means 62 are disposed through the lug member aperture 50 and have first, second and third external cylindrical portions 64, 66, 68. Cylindrical portion 64 is of a certain radius sized to fit within the cylindrical portion 52 of lug member 46. Cylindrical portion 64 spaces apart cylindrical portions 66, 68. Cylindrical portions 66, 68 have radii greater than the radius of cylindrical portion 64. The radii of cylindrical portions 66, 68 are equal to each other, and are sized so that cylindrical portions 66, 68 fit within cylindrical portions 54, 56 respectively of lug member 46. Cylindrical portions 64, 66 are interconnected by radial portion 70, and cylindrical portions 64, 68 are interconnected by radial portion 72.

As can particularly be seen in FIGS. 3 and 4, lug member cylindrical portion 52 and resilient means cylindrical portion 64 are sized so that they are in continuous contact, while lug member cylindrical portion 54 and resilient means cylindrical portion 66 are sized to define an annular gap 74 therebetween, and lug member cylindrical portion 56 and resilient means cylindrical portion 68 are accordingly sized to define an annular gap 76 therebetween, under normal tractor operating conditions. This is a quite unique feature, the importance of which will be described later in detail.

Resilient means 62 define a bore 78, the axis of which is aligned with the axes of the plate apertures 42, 44. Shaft means 80, comprising bolt 82, nut 84 and tube 86 snugly disposed on bolt 82, are positioned through the plate apertures 42, 44 and resilient means bore 78, and in contact with such resilient means bore 78. As seen in FIG. 3, radial portions 58 and 70 are in continuous contact with each other, as are radial portions 60 and 72. Further, as seen in FIG. 3, the overall axial dimension of resilient means 62 is such that resilient means 62 fit between plates 38 and 40 and are in contact with both. Meanwhile, the overall axial dimension of the lug member 46 is such that it fits between plates 38, 40 in spaced relation with each plate and is resiliently held in such spaced relation by the continuous contact of radial portions 58 and 70, and the continuous contact of radial portions 60 and 72.

The particular dimensions of resilient means 62 and lug member 46, including lug member aperture 50, allow a degree of travel of the lug member 46 (and thus the portion of the cab associated therewith) in all directions relative to the plates 38, 40 and in turn relative to the portion of the tractor 10 associated with the plates 38 and 40. The resilient means 62, it will be seen, resiliently resist travel of the lug member 46 relative to the plates 38, 40 in all directions by the compression of the resilient material which makes up the resilient means 62.

It will be understood that mounting means 20 are identical to the mounting means 18 described above.

The top portions of frame towers 30, 32 and additional plates 88, 90, together define two sets of spaced parallel plates, each set similar to plates 38, 40. The mounting means 14, 16 including these two sets of plates, it is to be understood, are similar to mounting means 18 described above in detail. It will be further understood that the operation of each mounting means is substantially the same, so that only the operation of one will be described in detail.

In the normal operation of the tractor 10 with cab 12 mounted thereon, lug member 46 is resiliently held by cylindrical portion 52 in contact with cylindrical portion 64 and radial portions 58, 60 in contact with radial portions 70, 72 respectively. The lug member 46, upon movement in directions generally perpendicular to the axis of the shaft means 80, is resisted initially only by the resiliency of the first cylindrical portion 64 of resilient means 62. This is the condition of normal operation of the tractor 10 over relatively smooth terrain, and the spring rate of the cylindrical portion 64 is chosen so that the cab 12 may be carried in a relatively vibration-free manner. When the tractor 10 is operated over rough or rocky terrain, the shock loads imposed on the operator station 26 are greater, causing the cylindrical portion 52, after a certain amount of travel of the lug member 46 in a direction perpendicular to the axis of shaft member 80, to compress sufficiently to bring cylindrical portion 54 and/or cylindrical portion 56 into contact with cylindrical portion 66 and/or cylindrical portion 68 respectively. That is, after a certain amount of such travel, further travel is resisted by the resilience of the first, and the second and/or third cylindrical portions 64, 66, 68, respectively increasing the spring rate which resists such further travel. Consequently, these shock loads are effectively absorbed by mounting means 18.

If the tractor 10 is accidentally overturned, a relatively great sideward load will bring lug member 46 into contact with one of the plates 38 or 40, overcoming the resilient force of resilient member 62. In such a case, such contact insures that extremely heavy loads on the cab 12 are properly transmitted to the frame 28 of the tractor 10.

Resilient means 62 comprise a pair of resilient rubber members 92 and 94. Resilient member 92 includes the cylindrical portions 64 and 68 and the radial portion 72 interconnecting them. Resilient member 94 includes cylindrical portion 66 and radial portion 70, as shown in FIG. 3. It will be seen that, because of this particular construction, upon removal of bolt 82 from the mounting means 18, the lug member 46 and resilient means 62 may be moved together from between plates 38, 40 to allow for easy removal and replacement of resilient members 92 and/or 94. Thus, special tools or equipment are not required for this removal and replacement.

As seen in FIGS. 1 and 2, the shaft means 96, 98 of mounting means 14, 16 are positioned with their respective axes disposed transversely of the tractor 10. Mounting means 14, 16 are positioned intermediate the front and rear portions of the tractor 10 with their respective shaft means axes aligned. Mounting means 18, 20 are positioned rearwardly of and below the mounting means 14, 16 with their shaft means 82, 100 having their respective axes aligned and disposed transversely of the tractor 10. Such positioning allows pivoting of the cab 12 about either the forward, higher axis defined by the shaft means 96, 98 of the mounting means 14 and 16, or the lower, rearward axis defined by the shaft means 82, 100 of mounting means 18 and 20 (after, of course, removal of the pair of shaft means which are not being used as pivots, to allow such pivoting). In such a structure, pivoting about the lower, rearward axis has the advantage that the moment arm defined by the center of gravity of cab 12 is relatively short, and does not need to be moved particularly far to be in an over-center position (i.e., to have the center of gravity of the cab 12 moved to the other side of the lower rearward axis).

It will be seen that herein are provided mounting means for mounting a protective cab to a tractor, said mounting means being effective in minimizing vibration of the cab during normal operation of the tractor, meanwhile also effectively damping shock loads on the cab during such operation. Such advantages come about because of the changing-spring-rate-means described in detail above, which utilize a lower spring rate to deal with cab vibration problems, and a higher spring rate to deal with greater shock loads. Such mounting means also provide the advantage that movement of the cab relative to the tractor is resiliently resisted in all directions, to provide proper damping of loads occurring in all directions.

What is claimed is:

1. Mounting means comprising:
    a. a pair of spaced, generally parallel plates defining axially aligned apertures;
    b. an annular lug member defining a lug aperture having (i) a first cylindrical portion of a first radius, (ii) a second cylindrical portion of a second radius greater than said first radius, and (iii) a radial portion interconnecting the first and second lug member aperture cylindrical portions;
    c. an annular resilient means having (i) a first external cylindrical portion of a certain radius sized to fit within the lug member first cylindrical portion, (ii) a second external cylindrical portion of a second radius greater than said first resilient means radius to fit within the lug member second cylindrical portion, and (iii) a radial portion interconnecting the first and second resilient means cylindrical portions, one of the lug member aperture cylindrical portions being sized to continuously contact the external resilient means cylindrical portion fitted therein, while the other lug member aperture cylindrical portion is sized to be continuously spaced from the external resilient means cylindrical portion fitted therein, to form an annular gap therebetween, and (iv) defining a bore the axis of which is aligned with the axes of the plate apertures; and,
    d. shaft means disposed through the plate apertures and resilient means bore and in contact with such resilient means bore, so that the lug member is movable in directions generally perpendicularly to the axis of the shaft means against the resiliency of one cylindrical portion only of the resilient means for a certain amount of travel, and against the resiliency of both cylindrical portions of the resilient means for additional travel.

2. The combination according to claim 1 wherein in said mounting means, the first lug member aperture cylindrical portion continuously contacts the first external resilient means cylindrical portion fitted therein, and the second lug member aperture cylindrical portion is continuously spaced from a second external resilient means cylindrical portion fitted therein to form an annular gap therebetween so that the lug member is movable in directions generally perpendicular to the axis of the shaft means against the resiliency of the first cylindrical portion only of the resilient means for a certain amount of travel, and against the resiliency of the first and second cylindrical portions of the resilient means for additional travel.

3. The combination according to claim 2 wherein the lug member aperture further has a third cylindrical portion of a radius equal to the radius of the lug member aperture second cylindrical portion and spaced therefrom by the lug member aperture first cylindrical portion, and a radial portion interconnecting the first and third lug member aperture cylindrical portions, and wherein the annular resilient means define a third external cylindrical portion of a radius equal to the radius of the resilient means second cylindrical portion, and spaced therefrom by the resilient means first cylindrical portion to fit within the lug member aperture third cylindrical portion, and a radial portion interconnecting the first and third resilient means cylindrical portions, so that the third lug member aperture cylindrical portion is continuously spaced from the third resilient means cylindrical portion fitted therein to form an annular gap therebetween so that the lug member is movable in directions generally perpendicular to the axis of the shaft means against the resiliency of the first cylindrical portion only of the resilient means for a certain amount of travel, and against the resiliency of the first, second and third cylindrical portions of the resilient means for additional travel.

4. The combination according to claim 3 wherein the radial portion interconnecting the first and second resilient means cylindrical portions is in continuous contact with the radial portion interconnecting the first and second lug member aperture cylindrical portions, and the radial portion interconnecting the second and third resilient means cylindrical portions is in continuous contact with the radial portion interconnecting the second and third lug member aperture cylindrical portions, and the overall axial dimension of the resilient means is such that the resilient means fit between the pair of spaced, generally parallel plates in contact with both, and the overall axial dimension of the lug member is such that said lug member fits between the pair of spaced, generally parallel plates in spaced relation with each plate, and is resiliently held in such spaced relation by (i) continuous contact of the radial portion interconnecting the first and second resilient means cylindrical portions with the radial portion interconnecting the first and second lug member aperture cylindrical portions, and (ii) the continuous contact of the radial portion interconnecting the second and third resilient means cylindrical portions with the radial portion interconnecting the second and third lug member aperture cylindrical portions.

5. The combination according to claim 4 wherein the lug member may be brought into contact with either one of the plates after a certain amount of travel toward said either one of the plates against the resiliency of the resilient means holding said lug member in spaced relation with each plate.

6. The combination according to claim 5 wherein the resilient means comprises a first resilient member comprising the first and second cylindrical portions of the resilient means, and the radial portion thereof interconnecting the first and second cylindrical portions of the resilient means, and a second resilient member comprising the third cylindrical portion of the resilient means, and the radial portion interconnecting the second and third cylindrical portions of the resilient means.

7. Mounting means comprising: first and second associated members; means interconnecting the first and second members to allow a degree of travel of the first member relative to the second member; resilient means for resiliently resisting a portion of travel in at least one direction at a given spring rate, and resiliently resisting additional travel in said one direction at a spring rate greater than said first-mentioned rate, and wherein said resilient means comprise a first resilient means portion in contact with and resisting said travel of the first member in said one direction over a certain amount of travel of the first member, and a second resilient means portion which, after said certain amount of travel is, along with the first resilient portion, in contact with and resists the further travel of the first member in said one direction, wherein the first associated member defines an aperture having (i) a first cylindrical portion of a first radius, (ii) a second cylindrical portion of a second radius greater than said first radius, (iii) a radial portion interconnecting the first and second member cylindrical portions, the resilient means comprising annular resilient means having (i) a first external cylindrical portion of a certain radius sized to fit within the member first cylindrical portion, (ii) a second external cylindrical portion of a second radius greater than the first resilient means radius to fit within the member second cylindrical portion, and (iii) a radial portion interconnecting the first and second resilient means cylindrical portions, one of the member aperture cylindrical portions being sized to continuously contact the external resilient means cylindrical portion fitted therein, while the other member aperture cylindrical portion is sized to be continuously spaced from the external resilient means cylindrical portion fitted therein, to form an annular gap therebetween, the resilient means being supported relative to the second associated member, the first member being movable against the resiliency of one of the cylindrical portions only of the resilient means for a certain amount of travel in a chosen direction, and against the resiliency of both cylindrical portions of the resilient means for additional travel in said chosen direction.

* * * * *